(12) United States Patent
Gao et al.

(10) Patent No.: US 10,627,616 B2
(45) Date of Patent: Apr. 21, 2020

(54) SWITCH ELEMENT, ARRAY SUBSTRATE, DISPLAY PANEL, AND DISPLAY DEVICE

(71) Applicants: BOE Technology Group Co., Ltd., Beijing (CN); HEFEI BOE DISPLAY TECHNOLOGY CO., LTD., Hefei, Anhui (CN)

(72) Inventors: Jincheng Gao, Beijing (CN); Xiaolong He, Beijing (CN); Zhanfeng Cao, Beijing (CN); Bin Zhang, Beijing (CN); Qi Yao, Beijing (CN); Zhengliang Li, Beijing (CN); Xuefei Sun, Beijing (CN); Wei Zhang, Beijing (CN)

(73) Assignees: BOE Technology Group Co., Ltd., Beijing (CN); HEFEI BOE DISPLAY TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/751,511

(22) PCT Filed: Aug. 24, 2017

(86) PCT No.: PCT/CN2017/098824
§ 371 (c)(1),
(2) Date: Feb. 9, 2018

(87) PCT Pub. No.: WO2018/076913
PCT Pub. Date: May 3, 2018

(65) Prior Publication Data
US 2019/0361219 A1 Nov. 28, 2019

(30) Foreign Application Priority Data
Oct. 27, 2016 (CN) .......................... 2016 1 0971097

(51) Int. Cl.
*G02B 26/00* (2006.01)
(52) U.S. Cl.
CPC ................................. *G02B 26/005* (2013.01)
(58) Field of Classification Search
CPC .... G02B 26/005; G02B 26/02; G02B 26/004; G02B 26/007
(Continued)

(56) References Cited

U.S. PATENT DOCUMENTS 7,706,051 B2 * 4/2010 Hattori .................... G02F 1/167
359/296
8,325,316 B2 * 12/2012 Lee ...................... G02B 26/005
345/107
(Continued)

FOREIGN PATENT DOCUMENTS

| CN | 1881003 A | 12/2006 |
| CN | 102129124 A | 7/2011 |
| CN | 106373532 A | 2/2017 |

*Primary Examiner* — Mohammed A Hasan
(74) *Attorney, Agent, or Firm* — Arent Fox LLP; Michael Fainberg

(57) ABSTRACT

A switch element, an array substrate, a display panel, and a display device are disclosed. The switch element includes: a first electrode, an insulation layer, where the first electrode is located on a first side of the insulation layer; a second electrode and a third electrode arranged spaced from each other, both of which are located on a second side of the insulation layer away from the first electrode; and a first oil ink located between the second electrode and the third electrode, where the first oil ink is electrically conductive, and configured to connect or disconnect the second electrode with or from the third electrode under control of the first electrode.

20 Claims, 3 Drawing Sheets

(58) Field of Classification Search
USPC .......................................................... 359/290
See application file for complete search history.

(56) References Cited

U.S. PATENT DOCUMENTS

| | | | |
|---|---|---|---|
| 8,514,479 B2 | 8/2013 | Bae et al. | |
| 8,854,718 B2 | 10/2014 | Jung et al. | |
| 2006/0285067 A1 | 12/2006 | Kim | |
| 2008/0239644 A1* | 10/2008 | Cassidy | G02F 1/13336 |
| | | | 361/679.02 |
| 2009/0051632 A1 | 2/2009 | Lee et al. | |
| 2013/0141775 A1 | 6/2013 | Yao et al. | |
| 2019/0280039 A1* | 9/2019 | Jia | H01L 27/14678 |

\* cited by examiner

SWITCH ELEMENT, ARRAY SUBSTRATE, DISPLAY PANEL, AND DISPLAY DEVICE

CROSS-REFERENCE TO RELATED APPLICATIONS

This application is a US National Stage of International Application No. PCT/CN2017/098824, filed on Aug. 24, 2017, designating the United States, and claiming the priority to Chinese Patent Application No. 201610971097.X, filed on Oct. 27, 2016, the content of which is hereby incorporated by reference in its entirety.

FIELD

Embodiments of the present disclosure relate to a switch element, an array substrate, a display panel, and a display device.

BACKGROUND

With the development of the display technologies, TV sets, mobile phones, tablets, notebook computers, and other display devices have been increasingly widely applied in our daily life. At present, the display device can be generally categorized into liquid crystal display devices and light-emitting diode display devices.

A liquid crystal display device generally includes an array substrate, a color film substrate, and a liquid crystal layer arranged between the array substrate and the color filter substrate. The array substrate includes a base substrate, and an array of Thin Film Transistors (TFTs), and pixel electrodes, arranged on the base substrate, where the array of TFTs consists of gates, gate insulation layers, active layers, source and drain electrodes, etc. The color filter substrate includes a base substrate, and color filters, black matrixes, etc., arranged on the base substrate. When displaying on the display device, voltages of the pixel electrodes can be controlled respectively using the array of thin film transistors as switch elements, so that an image can be displayed by displaying at the different pixels in different colors and at different grayscales.

SUMMARY

At least one embodiment of the present disclosure provides a switch. The switch element includes: an insulation layer; a first electrode located on a first side of the insulation layer; a second electrode and a third electrode arranged spaced from each other, both of which are located on a second side of the insulation layer away from the first electrode; and a first oil ink located between the second electrode and the third electrode, where the first oil ink is electrically conductive, and configured to connect or disconnect the second electrode with or from the third electrode under the control of the first electrode.

For example, in the switch element according to an embodiment of the present disclosure, under a condition that a voltage is applied to the first electrode, the first oil ink is configured to electrically disconnect the second electrode from the third electrode; and under a condition that no voltage is applied to the first electrode, the first oil ink is configured to electrically connect the second electrode with the third electrode.

For example, in the switch element according to an embodiment of the present disclosure, the insulation layer includes: a first oil ink adsorption layer contacting respectively with the first electrode and the first oil ink, where the material of the first oil ink adsorption layer includes an oleophilic and hydrophobic insulation material, and the first oil ink adsorption layer is oleophilic, and the first oil ink adsorption layer is configured to have the oleophilicity thereof varied along with voltage of the first electrode.

For example, in the switch element according to an embodiment of the present disclosure, the first oil ink adsorption layer is configured to have the oleophilicity thereof lowered along with the voltage of the first electrode.

For example, in the switch element according to an embodiment of the present disclosure, under a condition that no voltage is applied to the first electrode, the first oil ink is absorbed by the first oil ink adsorption layer in such a way that the first oil ink is electrically connected respectively with the second electrode and the third electrode; and under a condition that the voltage is applied to the first electrode, the first oil ink is absorbed by the first oil ink adsorption layer in such a way that the first oil ink is electrically disconnected from at least one of the second electrode and the third electrode.

For example, in the switch element according to an embodiment of the present disclosure, the first oil ink further includes an electrically conductive material, an organic solvent, and a bonding agent.

For example, in the switch element according to an embodiment of the present disclosure, the electrically conductive material is made of one or more of powder of silver, cooper, gold, aluminum, nickel, iron, molybdenum, tungsten, cadmium, platinum, columbium, chrome, titanium, manganese, graphite, carbon black, and carbon fiber, or made of alloy powder of more than two of silver, cooper, gold, aluminum, nickel, iron, molybdenum, tungsten, cadmium, platinum, columbium, chrome, titanium, and manganese.

For example, in the switch element according to an embodiment of the present disclosure, the bonding agent includes at least one of epoxy resin, alkyd resin, acrylic resin, polyurethane resin, melamine formaldehyde resin, phenolic resin, and vinyl chloride-vinyl acetate copolymer resin.

At least one embodiment of the present disclosure further provides an array substrate. The array substrate includes the switch elements according to any one of the embodiments above.

For example, the array substrate according to an embodiment of the present disclosure further includes: a base substrate; and a plurality of pixel control cavities located on the base substrate; wherein the first oil ink of the switch element is arranged in each of the pixel control cavities.

For example, in the array substrate according to an embodiment of the present disclosure, filling liquid immiscible with the first oil ink is filled in the pixel control cavities, and the filling liquid is insulating.

For example, in the array substrate according to an embodiment of the present disclosure, the filling liquid includes deionized water.

For example, the array substrate according to an embodiment of the present disclosure further includes: a plurality of pixels located on the array substrate, and each arranged in correspondence to each of the plurality of pixel control cavities.

For example, in the array substrate according to an embodiment of the present disclosure, each of the pixels includes a pixel display cavity. The pixel display cavity includes: a pixel electrode electrically connected with a third electrode in the pixel control cavity arranged in correspondence to the pixel; a second oil adsorption layer located on the side of the pixel electrode away from the base substrate; and second oil ink located on the side of the second oil ink adsorption layer away from the pixel electrode.

For example, in the array substrate according to an embodiment of the present disclosure, the pixel control cavity includes: a first cavity wall located on the base substrate, and configured to delimit the pixel control cavity; and a first shielding layer located on the side of the first cavity wall away from the base substrate, where no light can be transmitted through the first shielding layer.

For example, in the array substrate according to an embodiment of the present disclosure, the pixel display cavity includes: a second cavity wall located on the base substrate, and configured to delimit the pixel display cavity; and a second shielding layer located between the pixel control cavity and the pixel display cavity, and the base substrate, where no light can be transmitted through the second shielding layer.

For example, in the array substrate according to an embodiment of the present disclosure, materials of the first shielding layer and the second shielding layer include a material of black matrix.

For example, in the array substrate according to an embodiment of the present disclosure, the first cavity wall and the second cavity wall include black matrixes.

At least one embodiment of the present disclosure further provides a display panel, and the display panel includes the array substrate according to any one of the embodiments above.

For example, the display panel according to an embodiment of the present disclosure further includes an opposite substrate arranged opposite to the array substrate.

At least one embodiment of the present disclosure further provides a display device, and the display device includes the display panel according to any one of the embodiments above.

BRIEF DESCRIPTION OF THE DRAWINGS

In order to make the technical solutions according to the embodiments of the present disclosure more apparent, the drawings in the embodiments will be described below in brief, and apparently, the drawings to be described below illustrate only some embodiments of the invention, but are not intended to limit the disclosure thereto.

DETAILED DESCRIPTION OF THE EMBODIMENTS

Figure 1:
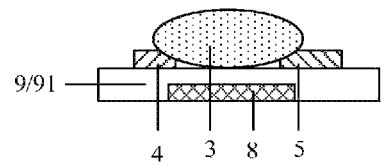
FIG. 1 is a schematic structural diagram of a switch element according to an embodiment of the present disclosure.

In order to make the objects, technical solutions, and advantages of the embodiments of the present disclosure more apparent, the technical solutions according to the embodiments of the present disclosure will be described below clearly and fully with reference to the drawings in the embodiments of the present disclosure. Apparently the embodiments to be described are a part but not all of the embodiments of the invention. All the other embodiments which can occur to those ordinarily skilled in the art based upon the embodiments of the present disclosure described here without any inventive effort shall fall into the scope of the present disclosure as claimed.

Unless defined otherwise, technical terms or scientific terms throughout the present disclosure shall convey their usual meaning as appreciated by those ordinarily skilled in the art to which the present disclosure pertains. The term "first", "second", or the like throughout the present disclosure does not suggest any order, number or significance, but is only intended to distinguish different components from each other. The term "include", "comprise", or the like refers to that an element or an item preceding to the term encompasses an element(s) or an item(s) succeeding to the term, and its (or their) equivalence(s), but shall not preclude another element(s) or item(s). The term "connect", "connected", or the like does not suggest physical or mechanical connection, but may include electrical connection no matter whether it is direct or indirect.

A Thin Film Transistor (TFT) is an important element in a display device. However the inventors of this application found that an active layer in a thin film transistor is typically made of a semiconductor material, e.g., amorphous silicon, amorphous silicon oxide semiconductor, or low-temperature poly-Si. All of these semiconductor materials are somewhat photosensitive, so the performance of the thin film transistor may be degraded after it has been exposed to light for a long period of time, thus degrading a display effect.

Embodiments of the present disclosure provide a switch element, an array substrate, a display panel, and a display device. The switch element includes: an insulation layer; a first electrode located on a first side of the insulation layer; a second electrode and a third electrode arranged spaced from each other, both of which are located on a second side of the insulation layer away from the first electrode; and a first oil ink located between the second electrode and the third electrode, where the first oil ink is electrically conductive, and configured to connect or disconnect the second electrode with or from the third electrode under control of the first electrode. In this way, the switch element can control the first electrode to connect or disconnect the second electrode and the third electrode, so that a novel switch element can be provided. Furthermore since the oil ink is insensitive to light, and will not be degraded even after long exposure, there is good stability of the switch element, and the performance of the switch element will not be degraded due to long exposure, so that a display effect of a display device including the switch element can be guaranteed.

The switch element, the array substrate, the display panel, and the display device according to the embodiments of the present disclosure will be described below in details with reference to the drawings.

Figure 2:
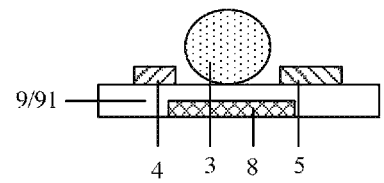
FIG. 2 is a schematic structural diagram of another switch element according to an embodiment of the present disclosure.

An embodiment of the present disclosure provides a switch element. FIG. 1 and FIG. 2 are schematic structural diagrams of a switch element according to this embodiment, in which a bottom-gate structure is shown as an example, where a first electrode is arranged in the bottom part of the switch element, but the same principle will apply to a top-gate structure the first electrode is arranged in the top part of the switch element. The switch element includes a first electrode 8, a second electrode 4, a third electrode 5, an insulation layer 9, and a first oil ink 3. The insulation layer 9 is located over the first electrode 8, that is, the first electrode is located on a first side of the insulation layer 9; the second electrode 4 and the third electrode 5 are arranged spaced from each other, and located on the side of the insulation layer 9 away from the first electrode 8, i.e., a second side; and the first oil ink 3 is located between the second electrode 4 and the third electrode 5. The first oil ink 3 is electrically conductive, and can be controlled by the first electrode 8, for example, to connect or disconnect the second electrode 4 and the third electrode 5 under a condition that voltage or no voltage is applied to the first electrode.

In the switch element according to this embodiment, the first oil ink can be electrically conductive, and can connect or disconnect the second electrode and the third electrode under a condition that voltage or no voltage is applied to the first electrode, so the switch element can connect or disconnect the second electrode and the third electrode by applying voltage or no voltage to the first electrode, so that a novel switch element can be provided. Furthermore since the oil ink is insensitive to light, and will not be degraded even after long exposure, there is good stability of the switch element, and the performance of the switch element will not be degraded after long exposure, so that a display effect of a display device including the switch elements can be guaranteed.

For example, in some implementations, the first electrode can be a gate.

For example, in some implementations, the second electrode can be a source, and the third electrode can be a drain, or the second electrode can be a drain, and the third electrode can be a source.

For example, in some implementations, the shape of the first oil link 3 can be varied along with the voltage of the first electrode 8, so that the second electrode 4 can be electrically connected with or disconnected from the third electrode 5 under the condition that the voltage or no voltage is applied to the first electrode 8. As illustrated in FIG. 1, for example, under the condition that the shape of the first oil ink 3 approaches a "flat shape", the first oil link 3 can contact with both the second electrode 4 and the third electrode 5 to thereby electrically connect the second electrode 4 with the third electrode 5; and as illustrated in FIG. 2, under a condition that the shape of the oil ink 3 approaches a "spherical shape", the first oil ink 3 does not contact with either of the second electrode 4 and the third electrode 5 to thereby electrically disconnect the second electrode 4 from the third electrode 5; of course, the first oil ink 3 may not contact with both the second electrode 4 and the third electrode 5 to thereby electrically disconnect the second electrode 4 from the third electrode 5.

For example, in some implementations, under a condition that voltage is applied to the first electrode, the first oil ink can electrically disconnect the second electrode from the third electrode; and under a condition that no voltage is applied to the first electrode, the first oil ink can electrically connect the second electrode with the third electrode.

It shall be noted that the shape of the first oil ink can be varied as described above by controlling surface tension of the first oil ink using voltage on the first electrode. For example, under a condition that there is large surface tension of the first oil ink, the shape of the first oil ink likely approaches the "spherical shape", and under a condition that there is small surface tension of the first oil ink, the shape of the first oil ink likely approaches the "flat shape". Of course, the present disclosure will not be limited thereto, and the shape of the first oil ink can be varied otherwise.

For example, in some implementations, as illustrated in FIG. 1 and FIG. 2, the insulation layer 9 includes a first oil ink adsorption layer 91; and the first oil ink adsorption layer 91 contacts respectively with the first electrode 8 and the first oil ink 3, the material of the first oil ink adsorption layer 91 includes an oleophilic and hydrophobic material, and the first oil ink adsorption layer 91 is oleophilic, where the oleophilicity thereof is varied along with the voltage of the first electrode 8. In this way, the oleophilicity (hydrophobicity) of the first oil ink adsorption layer can be varied to thereby vary the absorbability of the first oil ink adsorption layer for the first oil ink so as to vary the shape of the first oil ink.

For example, the oleophilicity of the first oil ink adsorption layer 91 is configured to be lowered due to voltage of the first electrode 8. Under a condition that no voltage is applied, the surface of the first oil ink adsorption layer 91 made of the oleophilic and hydrophobic material is hydrophobic and oleophilic, and the majority of the first oil ink 3 is absorbed on the surface of the first oil ink adsorption layer 91, so the shape of the first oil ink 3 approaches the "flat shape", that is, the first oil ink is relatively scattered to such an extent that the second electrode 4 can be electrically connected with the third electrode 5 so that the second electrode 4 is electrically communicated with the third electrode 5; and under a condition that voltage is applied, the oleophilicity on the surface of the first oil ink adsorption layer 91 made of the oleophilic and hydrophobic material is lowered, and thus the first oil ink adsorption layer becomes more hydrophilic, so the part of the first oil ink 3 absorbed on the first oil ink adsorption layer 91 becomes less, and under a condition that the shape of the first oil ink 3 approaches the "spherical shape", the first oil ink is relatively constricted to such an extent that the first oil ink 3 can be electrically disconnected from at least one of the second electrode 4 and the third electrode 5. State otherwise, under a condition that no voltage is applied to the first electrode, the first oil ink is absorbed on the first oil ink adsorption layer in such a way that the first oil ink can be electrically connected respectively with the second electrode and the third electrode; and under a condition that voltage is applied to the first electrode, the first oil ink is absorbed on the first oil ink adsorption layer in such a way that the first oil ink can be electrically disconnected from at least one of the second electrode and the third electrode.

Figure 3:
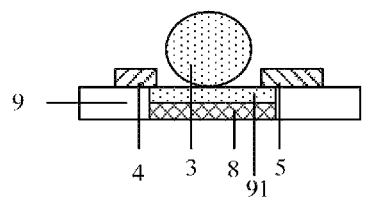
FIG. 3 is a schematic structural diagram of an array substrate according to an embodiment of the present disclosure.

As illustrated in FIG. 1 and FIG. 2, the insulation layer 9 and the first oil ink adsorption layer 91 can be structured at the same layer. Of course, the embodiment of the present disclosure will not be limited thereto, and as illustrated in FIG. 3, the first oil ink adsorption layer can be a part of the insulation layer.

For example, in some implementations, the first oil ink can be made of an electrically conductive material to thereby be electrically conductive.

For example, an electrically conductive material can be added to the first oil ink, e.g., electrically conductive material can be made of one or more of powder of silver, cooper, gold, aluminum, nickel, iron, molybdenum, tungsten, cadmium, platinum, columbium, chrome, titanium, manganese, graphite, carbon black, and carbon fiber, or made of alloy powder of more than two of silver, cooper, gold, aluminum, nickel, iron, molybdenum, tungsten, cadmium, platinum, columbium, chrome, titanium, and manganese.

For example, in some implementations, the first oil ink further includes organic solvent and a bonding agent.

For example, the bonding agent includes at least one of epoxy resin, alkyd resin, acrylic resin, polyurethane resin, melamine formaldehyde resin, phenolic resin, and vinyl chloride-vinyl acetate copolymer resin.

Based upon the same inventive idea, an embodiment of the present disclosure further provides an array substrate. FIG. 3 illustrates an array substrate according to this embodiment. The array substrate includes the switch elements according to any one of the embodiments above. Since the oil ink is insensitive to light, and will not be degraded even after long exposure, there is good stability of the array substrate, and the performance of the array substrate will not be degraded after the switch elements have been exposed to light for a long period of time, so that a display effect of a display device including the array substrate can be guaranteed.

Figure 4:
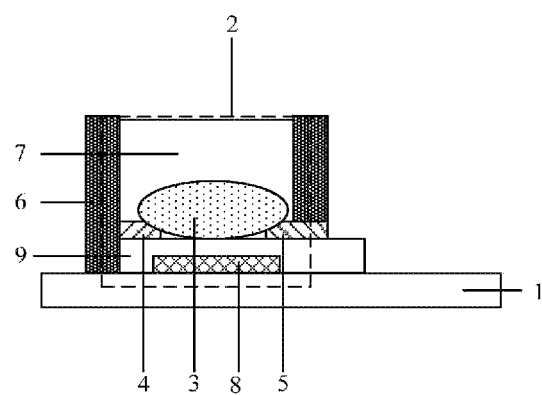
FIG. 4 is a schematic structural diagram of another array substrate according to an embodiment of the present disclosure.

For example, in some implementations, as illustrated in FIG. 4, the array substrate further includes a base substrate 1, and a plurality of pixel control cavities 2 located on the base substrate 1. The switch elements are arranged in the pixel control cavities 2, so that the pixel control cavities 2 can protect the first oil ink 3, and have the first oil ink 3 positioned in place.

For example, in some implementations, the first electrode can be a gate.

For example, in some implementations, the second electrode is a source, and the third electrode is a drain, or the second electrode is a drain, and the third electrode is a source. FIG. 4 shows only one pixel control cavity 2 for illustration, each pixel control cavity 2 can be positioned in place by a first cavity wall 6 located on the base substrate 1, that is, the pixel control cavity 2 is located in an area delimited by the first cavity wall 6. Furthermore the first oil ink 3 in the state as illustrated in FIG. 4 can electrically connect the second electrode 4 with the third electrode 5.

FIG. 4 illustrates the pixel control cavity 2 including the switch element in a top-gate structure, but the same will apply to the switch element in a bottom-gate structure.

For example, in some implementations, as illustrated in FIG. 4, filling liquid 7 immiscible with the first oil ink 3 is filled in the pixel control cavity 2, where the filling liquid 7 is insulating, so the filling liquid 7 can maintain the integrity of the first oil ink 3.

For example, in some implementations, in order to avoid the filling liquid 7 from electrically affecting the first oil ink 3, the second electrode 4, and the third electrode 5, the filling liquid 7 can neither dissolve, nor be dissolved by, the first oil ink 3, and is not electrically conductive.

For example, in some implementations, the filling liquid 7 can be deionized water.

For example, in some implementations, as illustrated in FIG. 4, the switch element 2 can be completely arranged in the pixel control cavity 2.

For example, in some implementations, the insulation layer 9 includes a first oil ink adsorption layer 91; and the first oil ink adsorption layer 91 contacts respectively with the first electrode 8 and the first oil ink 3, the material of the first oil ink adsorption layer 91 includes an oleophilic and hydrophobic material, and the first oil ink adsorption layer 91 is oleophilic, where the oleophilicity thereof is varied due to voltage on the first electrode 8. The first electrode 8 has the first oil ink adsorption layer 91 absorb the first oil ink 3 between the second electrode 4 and the third electrode 5 to thereby electrically connect or disconnect the second electrode 4 with or from the third electrode 5.

As illustrated in FIG. 3, the material of the first oil ink adsorption layer is a hydrophobic insulation material. Since the surface of the hydrophobic insulation material is hydrophilic and oleophilic under the condition that no voltage is applied thereto, the majority of the first oil ink 3 is absorbed on the surface of the first oil ink adsorption layer 91, so the shape of the first oil ink 3 approaches the "flat shape", that is, the first oil ink is relatively scattered to such an extent that the second electrode 4 can be electrically connected with the third electrode 5 so that the second electrode 4 is electrically communicated with the third electrode 5; and under a condition that voltage is applied, the oleophilicity on the surface of the hydrophobic insulation material is varied, and thus the hydrophobic material becomes more hydrophilic, so the part of the first oil ink 3 absorbed on the first oil ink adsorption layer 91 becomes less, that is, the first oil ink is relatively constricted to such an extent that the first oil ink 3 can be electrically disconnected from at least one of the second electrode 4 and the third electrode 5. In this way, in the structure as illustrated in FIG. 3, the voltage on the first electrode 8 is controlled to thereby control the oleophilicity (hydrophobicity) of the hydrophobic insulation material. For example, under a condition that no voltage is applied to the first electrode 8 of the switch element, the first oil ink 3 is absorbed on the first oil ink adsorption layer 91 so that the first oil ink 3 is electrically connected with both the second electrode 4 and the third electrode 5 to thereby electrically communicate the second electrode 4 with the third electrode 5; and under a condition that voltage is applied to the first electrode 8, the first oil ink 3 is absorbed on the first oil ink adsorption layer 91 so that the first oil ink 3 is electrically disconnected from at least one of the second electrode 4 and the third electrode 5.

Figure 5:
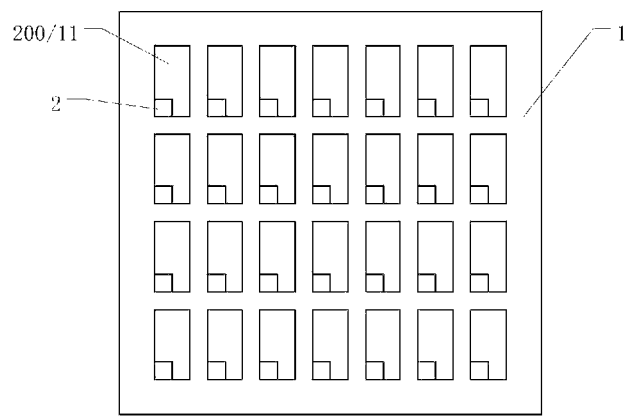
FIG. 5 is a schematic plan view of an array substrate according to an embodiment of the present disclosure.

FIG. 5 is a schematic plan view of another array substrate according to an embodiment of the present disclosure. As illustrated in FIG. 5, the array substrate further includes a plurality of pixels 200. The plurality of pixels 200 are located on an array substrate 1, and each is arranged in correspondence to each of pixel control cavities 2. In this way, respective pixels can be controlled using the switch elements located in the pixel control cavities 2 to thereby display an image.

Figure 6:
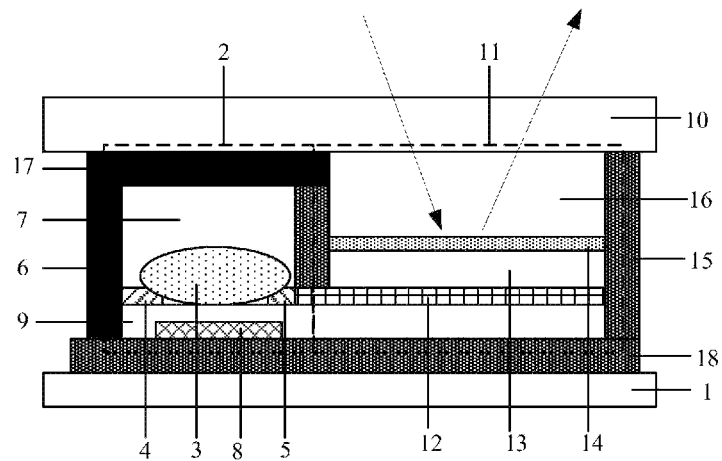
FIG. 6 is a schematic sectional view of a display panel according to an embodiment of the present disclosure.

FIG. 6 is a schematic sectional view of a display panel according to an embodiment of the present disclosure, where the display panel includes an array substrate. As illustrated in FIG. 6, a pixel 200 includes a pixel display cavity 11, which includes a pixel electrode 12 electrically connected with a third electrode 5 in a pixel control cavity 2 arranged in correspondence to the pixel 200, a second oil adsorption layer 13, and second oil ink 14. The second oil adsorption layer 13 is located on the side of the pixel electrode 12 away from a base substrate 1; and the second oil 14 is located on the side of the second oil adsorption layer 13 away from the pixel electrode 12.

For example, in some example, the second oil ink 14 can be oil ink in one of three colors R, G, and B.

FIG. 6 shows only one pixel control cavity and one pixel display cavity for illustration, where the pixel display cavity 11 is positioned in place by a second cavity wall 15 on the base substrate 1, that is, the pixel display cavity is located in an area delimited by the second cavity wall 15, and the pixel display cavity 11 is also filled with filling liquid 16.

For example, in some implementations, the filling liquid 16 in the pixel display cavity 11 is the same as the filling liquid 7 in the pixel control cavity 2.

For example, in some implementations, both the pixel display cavity 11 and the pixel control cavity 2 are filled with deionized water.

For example, in some implementations, as illustrated in FIG. 6, a part of the first cavity wall 6 can be a part of the second cavity wall 15 to thereby reduce an area occupied by the first cavity wall and the second cavity wall.

For example, in some implementations, as illustrated in FIG. 6, the array substrate further includes a first shielding layer 17 located on the side of the first cavity wall 6 away from the base substrate 1, and no light can be transmitted through the first shielding layer 17. In this way, the side of the pixel control cavity 2 away from the base substrate 1 is shielded by the first shielding layer 17 to thereby avoid the third electrode 4 and the fourth electrode 5 from emitting light.

For example, in some implementations, as illustrated in FIG. 6, the array substrate further includes a second shielding layer 18 located between the pixel control cavity 2 and the pixel display cavity 11, and the base substrate 1. No light can be transmitted through the second shielding layer 18. In this way, both the sides of the pixel control cavity 2 away from and proximate to the base substrate 1 are shielded so that no light will be reflected; and only the side of the pixel display cavity 10 proximate to the base substrate 1 is shielded, and the side thereof away from the base substrate 1 is not shielded. As can be apparent in the directions of the arrows illustrated in FIG. 6, light from the outside can be emitted into the pixel display cavity 10, and then reflected, so that an image is displayed as a result of the reflection.

For example, there are a number of materials of the first shielding layer 17 and the second shielding layer 18, and for example, both the materials of the first shielding layer 17 and the second shielding layer 18 are materials of black matrix.

For example, there are a number of materials of the cavity walls (the first cavity wall 6 and the second cavity wall 15) of the pixel control cavity 2 and the pixel display cavity 11, and for example, the cavity wall 6 of the pixel control cavity, and the cavity wall 15 of the pixel display cavity are material for black matrix. In this way, the black matrixes are embodied as the cavity walls so that light can be prevented from being projected onto the second electrode and the third electrode, which would otherwise result in reflection of the light, and they can be fabricated together with the first shielding layer and the second shielding layer to thereby simplify a process, and improve the production efficiency.

For example, the second oil adsorption layer 13 in FIG. 6 is configured to absorb the second oil ink 14. For example, the material of the second oil adsorption layer 13 is a hydrophobic and insulating material, and voltage applied to the pixel electrode 12 can be controlled to thereby control the absorbability of the second oil adsorption layer 13 for the second oil ink 14; and for example, under a condition that no voltage is applied to the pixel electrode 12, the surface of the hydrophobic insulation material is hydrophobic and oleophilic, and the majority of the second oil ink 14 is absorbed on the surface of the second oil adsorption layer 13, that is, the second oil ink is relatively scattered; and under a condition that voltage is applied to the pixel electrode 12, the hydrophilicity of the hydrophobic insulation material is varied, and thus the hydrophobic material becomes more hydrophilic, so that the part of the second oil ink 14 absorbed by the second oil adsorption layer 13 becomes less, that is, the second oil ink is relatively constricted. The area of the surface of the second oil ink 14, on which the light from the outside is reflected, under a condition that the second oil ink is relatively constricted is different from that under a condition that the second oil ink is relatively scattered, so there is also different brightness of the reflected light, thus resulting in different grayscales.

Hereupon a display panel including the array substrate in a non-display mode and a display mode will be described below by way of an example.

For example, in the non-display mode, no voltage is applied to the first electrodes 8, the second electrodes 4 in the respective pixel control cavities 2. In this embodiment, no voltage is applied to the first electrodes 8, and the first oil ink 3 can electrically connect the second electrodes 4 with the third electrodes 5, but since no voltage is applied to the second electrodes 4, no voltage will be applied to the pixel electrodes 12 electrically connected with the third electrodes 5, and the second oil ink 14 in the respective pixel display cavities 11 is significantly absorbed on the second oil ink adsorption layers 13, and thus scattered uniformly, so that white light is reflected throughout the screen, and no image is displayed.

Figure 7:
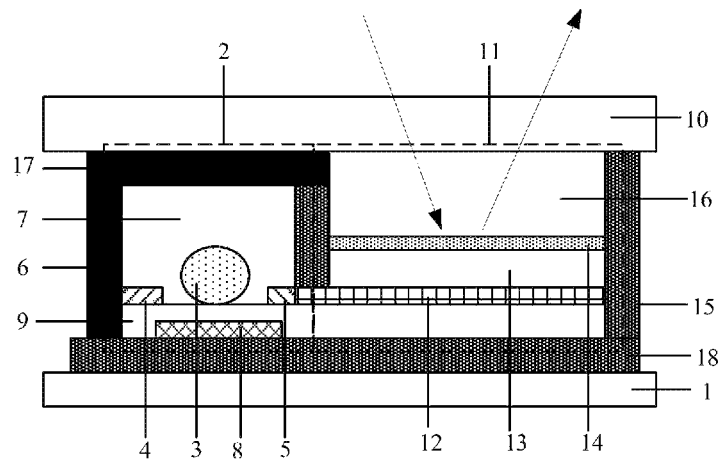
FIG. 7 is a first schematic diagram illustrating a state of a display panel according to an embodiment of the present disclosure.
Figure 8:
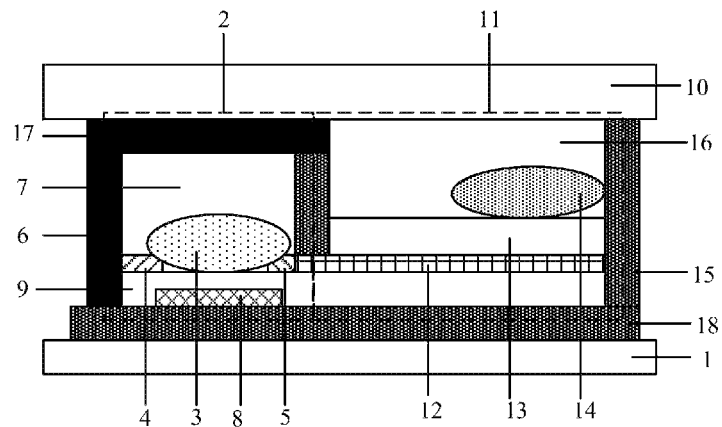
FIG. 8 is a second schematic diagram illustrating a state of a display panel according to an embodiment of the present disclosure.
Figure 9:
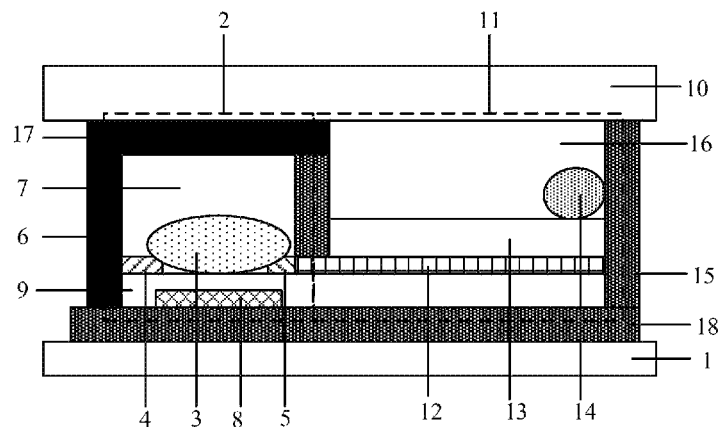
FIG. 9 is a third schematic diagram illustrating a state of a display panel according to an embodiment of the present disclosure.

In the normal display mode, for example, under a condition that the brightness of the respective pixel display cavities 11 is maximized, voltage is applied to the first electrodes 8 in the respective pixel control cavities 2 corresponding thereto, and no voltage is applied to the second electrodes 4; and under a condition that the brightness of the respective pixel display cavities 11 is not maximized, no voltage is applied to the first electrodes 8 in the respective pixel control cavities 2 corresponding thereto, and voltage is applied to the second electrodes 4; and furthermore there is different brightness of the respective pixel display cavities 11, and different voltage is applied to the corresponding second electrodes 4. In this embodiment, in the normal display mode, if the brightness of the pixel display cavities 11 needs to be maximized, then voltage will be applied to the first electrodes 8, and as illustrated in FIG. 7, the first oil ink 3 is relatively constricted to such an extent that the second electrodes 14 are disconnected from the third electrodes 5; no voltage is applied to the pixel electrodes 12, the second oil ink adsorption layers 13 are oleophilic and hydrophobic, the second oil ink 14 is scattered as much as possible, and there is the highest brightness of reflected light from the outside. If the brightness of the pixel display cavities 11 needs to be not maximized, then no voltage will be applied to the first electrodes 8, and as illustrated in FIG. 4, the first oil ink 3 is relatively scattered to such an extent that the second electrodes 4 are electrically communicated with the third electrodes 5, and voltage is applied to the second electrodes 4, so voltage is applied to the pixel electrodes 12, and the hydrophilicity of the second oil ink adsorption layers 13 is varied, and thus they become more hydrophilic, so that the second oil ink 14 is relatively constricted. There is different voltage of the pixel electrodes 12, the second oil ink 14 is constricted differently, and there is different brightness of reflected light from the outside, so that an image is displayed. Here the higher the voltage of a pixel electrode 12 is, the more the second oil ink 14 is constricted. For example, under a condition that the voltage of a pixel electrode is 10V, the second oil ink 14 is constricted by a factor of 2 as illustrated in FIG. 8; and under a condition that the voltage of the pixel electrode is 15V, the second oil ink is constricted as much as possible as illustrated in FIG. 9.

Based upon the same inventive idea, an embodiment of the present disclosure further provides a display panel including the array substrate according to any one of the embodiments above. In the display panel according to the embodiment of the present disclosure, since the oil ink is insensitive to light, and will not be degraded even after long exposure, there is good stability of the display panel, and the performance of the display panel will not be degraded after it has been exposed to light for a long period of time, so that a display effect of a display device including the display panel can be guaranteed.

For example, in some implementations, the display panel further includes an opposite substrate 10 arranged opposite to the array substrate 1 as illustrated in FIG. 6 to FIG. 9.

Based upon the same inventive idea, an embodiment of the present disclosure further provides a display device including the array panel according to any one of the embodiments above. In the display device according to the embodiment of the present disclosure, since the oil ink is insensitive to light, and will not be degraded even after long exposure, there is good stability of the display device, and the performance of the display device will not be degraded after it has been exposed to light for a long period of time, so that a display effect of the display device can be guaranteed.

For example, the display device can be an advertisement board, an advertisement box, or another reflective display device.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A switch element, comprising:
   an insulation layer;
   a first electrode located on a first side of the insulation layer;
   a second electrode and a third electrode arranged spaced from each other, both of which are located on a second side of the insulation layer away from the first electrode; and
   a first oil ink located between the second electrode and the third electrode,
   wherein the first oil ink is electrically conductive, and configured to connect or disconnect the second electrode with or from the third electrode under control of the first electrode.

2. The switch element according to claim 1, wherein under a condition that voltage is applied to the first electrode, the first oil ink is configured to electrically disconnect the second electrode from the third electrode; and under a condition that no voltage is applied to the first electrode, the first oil ink is configured to electrically connect the second electrode with the third electrode.

3. The switch element according to claim 1, wherein the insulation layer comprises:
   a first oil ink adsorption layer contacting respectively with the first electrode and the first oil ink,
   wherein material of the first oil ink adsorption layer comprises an oleophilic and hydrophobic insulation material, and the first oil ink adsorption layer is oleophilic, and the first oil ink adsorption layer is configured to have oleophilicity thereof varied along with voltage of the first electrode.

4. The switch element according to claim 3, wherein the first oil ink adsorption layer is configured to have the oleophilicity thereof lowered along with the voltage of the first electrode.

5. The switch element according to claim 4, wherein under a condition that no voltage is applied to the first electrode, the first oil ink is absorbed by the first oil ink adsorption layer in such a way that the first oil ink is electrically connected respectively with the second electrode and the third electrode; and under a condition that the voltage is applied to the first electrode, the first oil ink is absorbed by the first oil ink adsorption layer in such a way that the first oil ink is electrically disconnected from at least one of the second electrode and the third electrode.

6. The switch element according to claim 1, wherein the first oil ink further comprises an electrically conductive material, an organic solvent, and a bonding agent.

7. The switch element according to claim 6, wherein electrically conductive material is made of one or more of powder of silver, cooper, gold, aluminum, nickel, iron, molybdenum, tungsten, cadmium, platinum, columbium, chrome, titanium, manganese, graphite, carbon black, and carbon fiber, or made of alloy powder of more than two of silver, cooper, gold, aluminum, nickel, iron, molybdenum, tungsten, cadmium, platinum, columbium, chrome, titanium, and manganese.

8. The switch element according to claim 6, wherein the bonding agent comprises at least one of epoxy resin, alkyd resin, acrylic resin, polyurethane resin, melamine formaldehyde resin, phenolic resin, and vinyl chloride-vinyl acetate copolymer resin.

9. An array substrate, comprising the switch element according to claim 1.

10. The array substrate according to claim 9, wherein the array substrate further comprises:
    a base substrate; and
    a plurality of pixel control cavities located on the base substrate;
    wherein the first oil ink of the switch element is arranged in each of the pixel control cavities.

11. The array substrate according to claim 10, wherein filling liquid which neither dissolve, nor be dissolved by, the first oil ink is filled in the pixel control cavities, and the filling liquid is insulating.

12. The array substrate according to claim 11, wherein the filling liquid comprises deionized water.

13. The array substrate according to claim 10, wherein the array substrate further comprises:
    a plurality of pixels located on the array substrate, and each arranged in correspondence to each of the plurality of pixel control cavities.

14. The array substrate according to claim 13, wherein each of the plurality of pixels comprises a pixel display cavity, which comprises:
    a pixel electrode electrically connected with a third electrode in the pixel control cavity arranged in correspondence to the pixel;
    a second oil adsorption layer located on a side of the pixel electrode away from the base substrate; and
    second oil ink located on a side of the second oil ink adsorption layer away from the pixel electrode.

15. The array substrate according to claim 14, wherein the pixel control cavity comprises:
   a first cavity wall located on the base substrate, and configured to delimit the pixel control cavity; and
   a first shielding layer located on the side of the first cavity wall away from the base substrate,
   wherein no light is allowed to be transmitted through the first shielding layer.

16. The array substrate according to claim 15, wherein the pixel display cavity comprises:
   a second cavity wall located on the base substrate, and configured to delimit the pixel display cavity; and
   a second shielding layer located between the pixel control cavity and the pixel display cavity, and the base substrate,
   wherein no light is allowed to be transmitted through the second shielding layer.

17. The array substrate according to claim 15, wherein materials of the first shielding layer and a second shielding layer comprise a material of black matrix.

18. The array substrate according to claim 15, wherein the first cavity wall and a second cavity wall comprise black matrixes.

19. A display panel, comprising the array substrate according to claim 9.

20. A display device, comprising the display panel according to claim 19.

* * * * *